Feb. 6, 1951 R. W. SEARS 2,540,834
ELECTRON DISCHARGE DEVICE
Filed Dec. 13, 1946 2 Sheets-Sheet 1
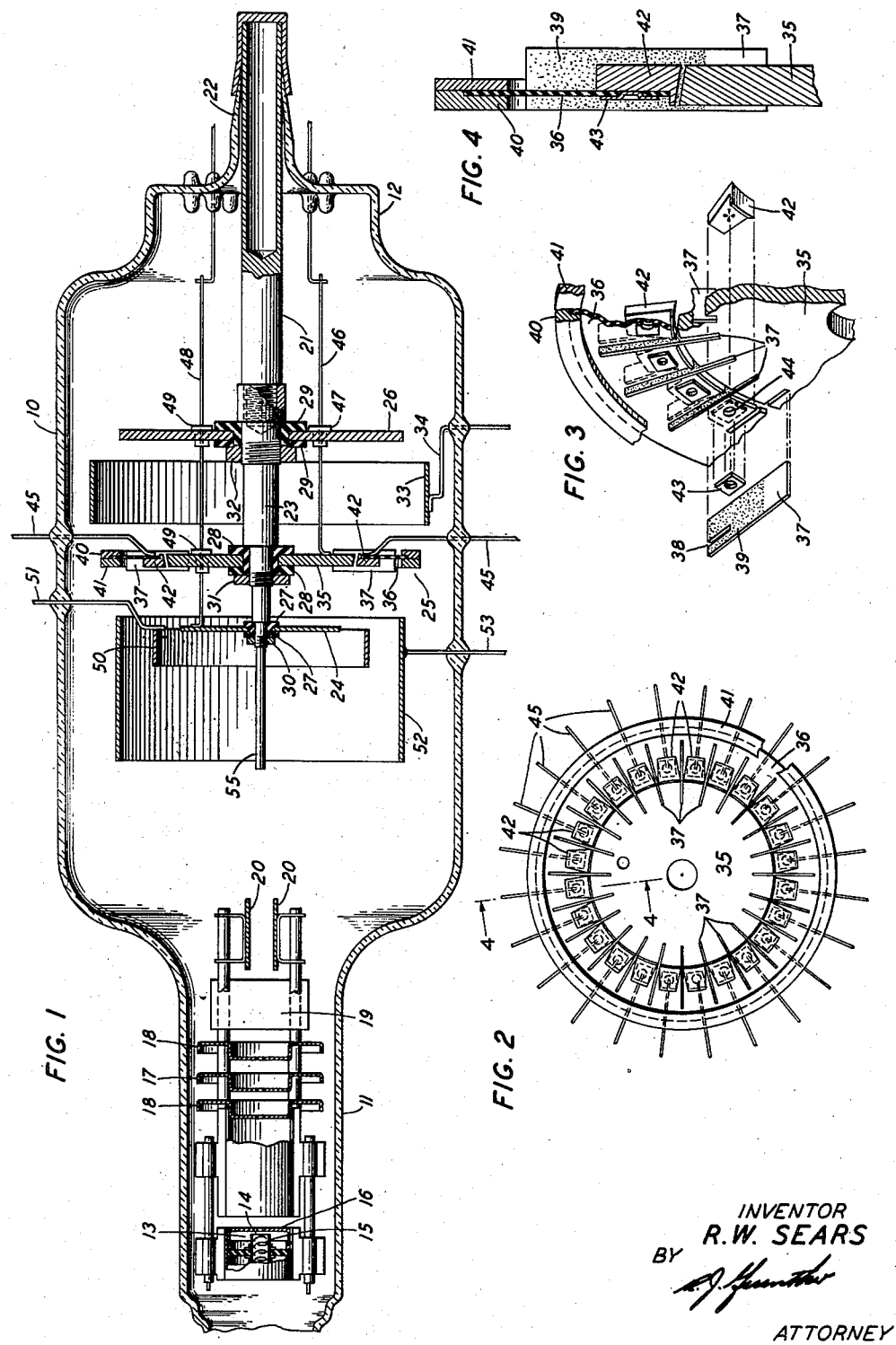
INVENTOR
R.W. SEARS
BY
ATTORNEY Feb. 6, 1951        R. W. SEARS        2,540,834
ELECTRON DISCHARGE DEVICE
Filed Dec. 13, 1946        2 Sheets—Sheet 2
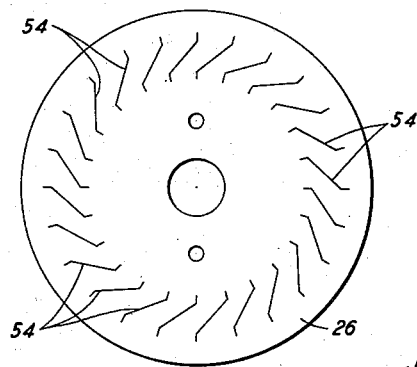
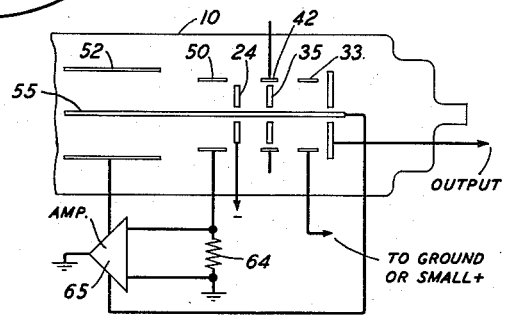
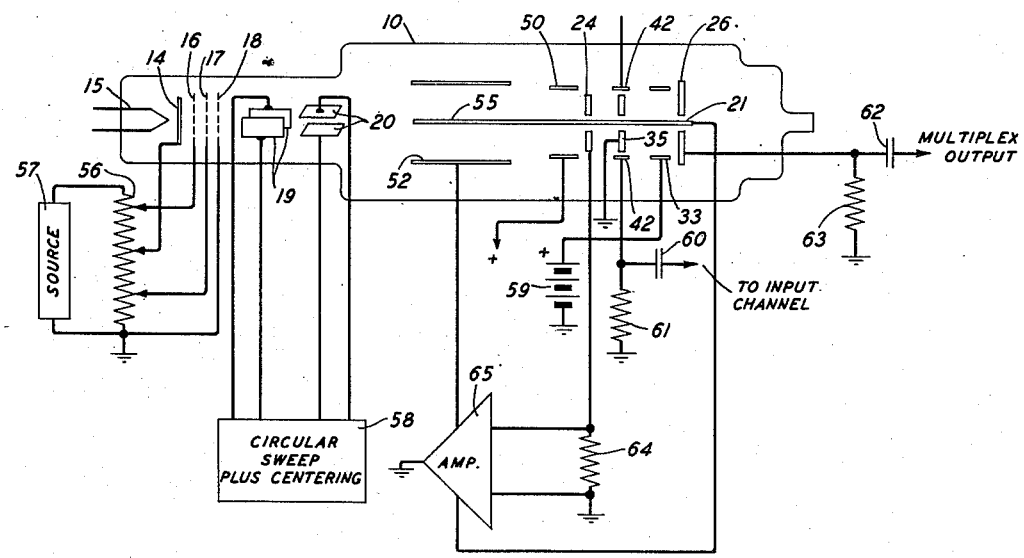
INVENTOR
R. W. SEARS
BY
ATTORNEY Patented Feb. 6, 1951

2,540,834

UNITED STATES PATENT OFFICE 2,540,834

ELECTRON DISCHARGE DEVICE

Raymond W. Sears, West Orange, N. J., assignor to Bell Telephone Laboratories, Incorporated, New York, N. Y., a corporation of New York Application December 13, 1946, Serial No. 715,901

15 Claims. (Cl. 250—164)

This invention relates to electron discharge devices and more particularly to cathode ray devices especially suitable for use in multiplex telephone systems.

In one type of multiplex system, an electron beam is rotated to trace a closed path over a target or pulse forming electrode and is acted upon by signals from a plurality of signal channels, each signal being effective to deflect the beam at an angle to the trace at a point or time interval in the rotational cycle corresponding to the respective signal channel. Thus, at each of the intervals corresponding to the respective channels, the beam is deflected in accordance with the signal amplitude at the respective channel and what may be termed pulse position modulation is realized. In effect, the signals at the several channels are commutated at high frequency, and the output of the device comprises a multiplicity of pulses, each pulse having a position in time relative to the rotational cycle of the beam dependent upon the amplitude of the input signal pulse resulting therein.

It is eminently desirable, from the standpoint of accurate modulation and, hence, faithful resolution of input signals into output pulses, that the path followed by the beam due to the forces resulting in its rotation, and, consequently, the normal trace of the beam over the pulse forming electrode, be of constant preassigned configuration. Additionally, it is also particularly advantageous, especially when the commutating frequency is very high, that the output pulses be of short length or duration.

One object of this invention is to maintain the rotational beam path, and hence the trace of the beam upon the pulse forming or target electrode, in the absence of input signal pulses, accurately fixed and of prescribed configuration.

Another object of this invention is to facilitate the attainment of very short output pulses in a device of the character described.

A further object of this invention is to simplify the construction of cathode ray devices particularly suitable for use in multiplex telephone systems.

In accordance with one feature of this invention, in a cathode ray device having a deflection system for rotating the beam, an auxiliary deflection control is provided for holding the beam to a path of preassigned configuration in response to rotation by the system, despite variations in the deflecting forces due to the system, such as, for example, variations resulting from changes in the voltages applied to the deflecting electrodes.

In accordance with another feature of this invention, the target or pulse forming electrode comprises a disc or plate having thereon fine lines, one for each input channel, extending at an angle to the direction of deflection of the beam in response to input signals, the lines having a coefficient of secondary emission different from the remainder of the target or pulse forming electrode.

In accordance with still another feature of this invention, the several deflection units for displacing the beam in accordance with input signal pulses are fabricated in a unitary assembly comprising a central electrode and a plurality of deflector plates, one for each signal channel, disposed around the periphery of the central electrode to define deflection gaps therewith. The several plates are mounted from a common support member, for example of insulating material, attached to the central electrode.

In accordance with still another feature of this invention, the support member is attached to the central electrode by metallic strips each of which extends between two adjacent deflector plates and has opposite faces of insulating material and contacted by the plates. The strips perform the dual functions of spacing adjacent deflector plates and electrostatically shielding adjacent gaps from one another.

The invention and the above-noted and other features thereof will be understood more clearly and fully from the following detailed description with reference to the accompanying drawing, in which:

Fig. 1 is a side elevational view mainly in section of an electron discharge device illustrative of one embodiment of this invention;

Fig. 2 is a plan view of the unitary assembly including the plurality of deflector plates and the shield-spacers;

Fig. 3 is a fragmentary, partly exploded, perspective view of the assembly shown in Fig. 2;

Fig. 4 is a detail sectional view taken along plane 4—4 of Fig. 2;

Fig. 5 is a face view of the target or pulse forming electrode;

Fig. 6 is a circuit diagram illustrating one way in which the discharge device shown in Fig. 1 may be operated, and Fig. 7 is a fragmentary circuit diagram illustrating another way in which the device may be operated.

Referring now to the drawing, the electron discharge device illustrated in Fig. 1 comprises an evacuated, vitreous enclosing vessel 10 having a neck portion 11 at one end and a stem portion 12 at the other end. Mounted within the neck portion 11 is an electron gun, which may be of known construction, for projecting a highly concentrated electron beam axially of the vessel 10. The gun comprises a cathode 13, the surface 14 of which is coated with electron emissive material, a heater element 15 for the cathode, a centrally apertured control electrode 16, and centrally apertured focussing and accelerating anodes 17 and 18 aligned axially with the control electrode 15 and cathode 13. Two pairs of deflector plates 19 and 20 in space quadrature are mounted in front of the electron gun. Electrical connection to the deflector plates and to the electrodes of the electron gun may be established by way of leading-in conductors extending therefrom to terminals upon a base, not shown, affixed to the neck portion 11.

A rigid metallic post or rod 21 is sealed to and supported by a tubulature 22 extending from the stem portion 12 and has threaded thereto a stepped metallic post or support 23. Mounted in coaxial relation by the support or post 23 are a beam guide electrode 24, a deflector plate assembly 25 and a target or pulse forming electrode 26, each of which is held between insulating collars 27, 28 and 29, respectively. The collars are clamped against shoulders upon the support 23 by nuts 30, 31 and 32, respectively, threaded upon the post or support 23.

A cylindrical collector electrode 33, coaxial with the post or support 23 is supported opposite the target 26 by one or more leading-in conductors 34 sealed in the side wall of the vessel 10.

The deflector plate assembly 25 comprises a central, circular, metallic disc or plate 35 coaxially surrounded by an annular insulating support 36. The plate 35 and support 36 are provided with opposed, radially extending slots in which metallic strips or shields 37 are tightly fitted, each of the strips having a longitudinal slot 38 therein into which the support 36 fits. As illustrated in Figs. 3 and 4, the major portion of opposite faces of each of the strips 37 is coated with insulating material 39, for example aluminum oxide. Reinforcing rings 40 and 41 are provided at the periphery of the support 36.

A plurality of deflector plates 42 are disposed about the periphery of the plate or disc 35 and equally spaced therefrom to form therewith a plurality of substantially identical, arcuate deflection gaps. Each plate 42 is held securely to the support 36 by an indented metallic tab 43 extending through an aperture 44 in the support and welded to the associated plate 42. As shown clearly in Figs. 1 and 4, the juxtaposed faces of the deflector plates 42 and disc 35 are frusto-conical so that the gaps therebetween conform to the beam path thereat. Each deflector plate 42 is provided with an individual leading-in conductor 45 sealed in the side wall of the vessel 10. A leading-in conductor 46 for the disc or plate 35 is sealed in the stem 12 and passes through an insulating eyelet 47 in the target or pulse forming electrode 26.

The beam guide electrode 24, in the form illustrated, is a circular or substantially circular disc, which may be of a material, such as carbonized nickel, having a secondary electron emissive coefficient less than unity or of a material having such coefficient greater than unity. This disc is of such diameter or transverse dimensions that its periphery is substantially coincident with the beam path as the beam is rotated to pass through the deflection gaps between the plate 35 and the individual deflector plates 42. Electrical connection to the beam guide electrode 24 may be established by way of a leading-in conductor 48 sealed in the stem 12 and extending through insulating eyelets 49 fitted in apertures in the plate 35 and electrode 26.

Adjacent the guide electrode 24 is a short cylindrical collector electrode 50, which may be mounted by a rigid leading-in conductor 51 sealed in the side wall of the enclosing vessel 10.

A cylindrical electrode 52, for example a metal cylinder as shown or in the form of a conductive, e. g. deposited colloidal graphite, coating upon the inner wall of the vessel 10, is coaxial with the inner end portion 55 of the rod 23 and defines a deflecting system therewith. Electrical connection to the electrode 52 may be made by a conductor 53 sealed in the side wall of the vessel 10.

The target or pulse forming electrode 26, shown in detail in Fig. 5, comprises a plate or circular disc having thereon, on its face toward the electron gun, a plurality of fine lines 54, one opposite and aligned with each of the deflection gaps between the plate 35 and the deflector plates 42. Each of the lines 54, as shown in Fig. 5, has radially extending inner and outer extreme portions and an intermediate non-radial portion. The plate and line materials have different secondary electron emission coefficients. In one illustrative construction, the plate 26 is of a silver-magnesium alloy having a coefficient of secondary electron emission of approximately 5 and the lines 54, for example 0.0025 inch wide, are of carbon printed upon the plate 26 and, hence, have a secondary emission coefficient less than unity. Alternatively, the materials involved could be such that the secondary emission coefficient of the lines is greater than that of the plate.

As is apparent, when the beam is rotated to pass between the deflection plates 35 and 42 and sweep circularly over the electrode 26, a current pulse will be produced every time the beam crosses a line 54.

One manner in which the device shown in Fig. 1 and described above, and wherein the secondary emission coefficient of disc 24 is less than unity, may be utilized, is illustrated in Fig. 6. The cathode 14 and the electrodes 16, 17 and 18 associated therewith in the electron gun are maintained at suitable potentials to produce a concentrated electron beam, by a potentiometer resistor 56 and source 57. A circular sweep voltage is produced between the deflector plates 19 and 20 by a source 58, the voltage being such that the sweep path is centered about the rod portion 55 and the beam just grazes the periphery of the beam guide electrode 24 and passes through the gaps between the deflector plates 35 and 42. The collector electrode 33 is maintained positive to ground as by a battery 59. The collector electrode 50 also is maintained positive to ground. The deflector plate 35 may be grounded as shown. Individual input signal channels, only one of which is shown, are provided for the deflector plates 42, each channel including a condenser 60 and input resistor 61. The target or pulse forming electrode 26 is connected to the output channel by way of a condenser 62 and resistor 63.

The beam guide electrode 24 is connected to the input resistor 64 of a direct current amplifier 65, the output of which, balanced to ground, is connected between the rod 21, 23, 55 and the cylindrical electrode 52 so that the potential between the electrodes 52 and 55 is determined by the beam current to the guide electrode 24. The poling is such that the radial deflecting force between electrodes 52 and 55 increases outwardly as the beam current to the guide electrode 24 increases.

When no signals are applied to the deflector plates 42 and the beam rotates in grazing incidence with the periphery of the guide electrode 24, the beam follows a circular trace over the target or pulse forming electrode 26 and passes over the inner radial portions of the lines 54. If the sweep circuit for the beam is disturbed, for example if the voltage from the source 58 varies, the beam path will tend to change so that, depending upon the polarity of the voltage change, the beam will either move radially inwardly or outwardly. If it moves inwardly, the beam current to the guide electrode 24 increases so that the deflecting potential between electrodes 52 and 55 changes in the sense to move the beam radially outwardly. In response to this change, the beam moves outwardly until it rotates in grazing incidence with the periphery of the beam guide electrode.

If, on the other hand, the disturbance in the sweep system is such that the beam tends to move radially outwardly, the beam moves away from the periphery of the electrode 24. As a result, the feedback voltage from the amplifier 65 changes in such sense that the deflecting potential between electrodes 52 and 55 is altered to move the beam radially inwardly back into grazing incidence with the periphery of the beam guide electrode 24.

Thus, the beam guide electrode 24 coupled in feedback relation through the amplifier 65 to the electrode 52 automatically controls the radial deflecting potential between electrodes 52 and 55 to hold the beam in grazing incidence with the periphery of the guide electrode. Consequently, the beam sweep is maintained such that the beam passes through the gaps between the deflector plates 35 and 42.

At each of these gaps, the beam is subject to deflection radially in accordance with the input from the respective input channel. As a result of such deflection, the point at which the beam sweeps over the line 54 corresponding to any deflection gap 35, 42 is determined by the deflecting potential, and hence the input signal, at that gap. As has been pointed out heretofore, whenever the beam crosses a line 54, an output pulse is produced. Inasmuch as the intermediate portion of each line 54 is non-radial and the beam deflection due to an input signal is radial, the time, relative to the sweep cycle, at which each pulse occurs varies in accordance with the amplitude of the input signal resulting in that pulse. Thus, the input signals from the several input channels are resolved into respective pulses each related in time to the sweep cycle in accordance with the respective signal amplitude. The output, therefore, is a pulse position modulated multiplex signal.

For the case noted, i. e., where the secondary emission coefficient of the electrode 24 is less than unity, an auxiliary electrode, e. g. an annulus, may be placed between the electrodes 24 and 35 to shield the electrode 24 from secondary electrons which may be released when the beam strikes the spacers 37.

In the case where the secondary emission coefficient of the electrode 24 is greater than unity, the collector electrode 50 is operated at a potential positive relative to that of the electrode 24 whereby secondary electrons produced at the edge portion of electrode 24 will flow to and be collected by the collector electrode 50. Connection to the amplifier 65 may be made from either collector electrode 50 or beam guide electrode 24, the amplifier 65 being poled appropriately to control the position of the beam so that it remains in grazing incidence with the periphery of the beam guide 24. The connections and relative potentials involved when connection to the amplifier is made from the collector electrode 50 are illustrated in Fig. 7.

Although specific embodiments of the invention have been shown and described, it will be understood that it is but illustrative and that various modifications may be made therein without departing from the scope and spirit of this invention as defined in the appended claims.

What is claimed is:

1. An electrical system comprising an electron discharge device comprising a target, means opposite thereto for projecting an electron beam toward said target, means for deflecting said beam in two coordinate dimensions to trace a closed path of preassigned configuration at a region between said beam projecting means and said target, and means for controlling said beam to maintain its trace at said region, said controlling means comprising a deflecting system and means responsive to departure of said beam from said path for energizing said deflecting system to return said beam to said path.

2. An electrical system comprising an electron discharge device comprising a target, means opposite thereto for projecting an electron beam toward said target, means for deflecting said beam in two coordinate dimensions to trace a closed path of preassigned configuration at a region between said beam projecting means and said target, and means for guiding said beam to hold its trace at said region, said guiding means comprising a guide electrode having an edge of said preassigned configuration, deflection means, and a feedback connection between said guide electrode and said deflection means energized in accordance with the beam current to said guide electrode for holding said beam in grazing incidence with said edge.

3. An electrical system comprising an electron discharge device comprising means for projecting an electron beam, an electrode opposite said means and having a margin of preassigned configuration, a first deflection means for deflecting said beam in two coordinate directions to follow a path adjacent and conforming to said margin, a second deflection means for deflecting said beam at an angle to said margin, and means comprising a feedback coupling between said electrode and said second deflection means for holding said beam to a path conforming to said margin, while deflected by said first deflection means.

4. An electrical system comprising an electron discharge device comprising a target, means opposite thereto for projecting an electron beam toward said target, means for deflecting said beam in two coordinate dimensions to trace a closed path of circular section at a region between said beam projecting means and said target, feedback means, and deflection means energized by said feedback means proportionately to departure of said beam from said path for maintaining said beam in said path.

5. An electrical system comprising an electron discharge device comprising a target, means opposite thereto for projecting an electron beam toward said target, means for deflecting said beam in two coordinate dimensions to trace a closed path of circular section at a region between said beam projecting means and said target, and means for controlling said beam to maintain its trace at said region, said controlling means comprising a guide electrode having a circular edge, deflection means and feedback means external to said electron discharge device for causing energization of said deflection means in response to variations of the grazing incidence of the beam upon the edge of said guide electrode.

6. An electrical system comprising an electron discharge device comprising means for projecting an electron beam, an electrode opposite said means and having a substantially circular periphery, a first deflection means for rotating said beam to follow a circular path adjacent said periphery, a second deflection means for deflecting said beam radially with respect to said periphery, and feedback means coupling said electrode and said second deflection means for holding said beam in proximity to said periphery, as it is deflected by said first deflection means.

7. An electron discharge device comprising a target, means opposite said target for projecting an electron beam to one face thereof, a first means for deflecting said beam to produce a preassigned trace upon said one face, said target having on said one face a plurality of spaced lines positioned to intersect said trace and each extending at an angle thereto, and a plurality of second deflection means electrically individual to and adjacent each of said lines to deflect said beam radially of said trace, said lines having a coefficient of secondary electron emission different from that of the remainder of said face.

8. An electron discharge device in accordance with claim 7 wherein said lines are of carbon and the remainder of said face is of a material having a secondary electron emission coefficient greater than unity.

9. An electron discharge device comprising a target, means opposite said target for projecting an electron beam to one face thereof, a first means for rotating said beam to produce a closed trace upon said one face, said target having upon said face a plurality of lines positioned to intersect said trace and extending other than normal thereto, said lines having a secondary electron emission coefficient different from that of the remainder of said face, and a plurality of second deflection means electrically individual to and adjacent each of said lines to deflect said beam radially of said trace.

10. An electron discharge device comprising a target, means opposite said target for projecting an electron beam to one face thereof, a first means for rotating said beam to produce a circular trace upon said one face, said target having on said one face a plurality of lines extending non-radially with respect to said trace and positioned to intersect said trace, said lines having a coefficient of secondary electron emission different from the remainder of said one face, and means for deflecting said beam radially of said trace, said deflecting means comprising a plurality of electrically individual deflector members each opposite a respective one of said lines.

11. An electron discharge device comprising a target, means opposite said target for projecting an electron beam thereto, a central deflector member between said means and said target and extending transversely with respect to the beam path therebetween, means for deflecting said beam to follow a path outside of and along the periphery of said central deflector member, a plurality of individual deflector members spaced along said periphery and defining a plurality of deflection gaps therewith, and means mounting said plurality of said members from said central deflector member.

12. An electron discharge device in accordance with claim 11 wherein said mounting means comprises an insulating member opposite and spaced from said periphery and supporting said plurality of deflector members, and shields extending between adjacent of said plurality of deflector members and affixed to said central deflector and insulating members.

13. An electron discharge device comprising a target, means opposite said target for projecting an electron beam thereto, a circular deflector plate between said target and said means and extending transversely of the beam path therebetween, an insulating member encompassing said plate and spaced from the periphery thereof, a plurality of deflector members mounted by said insulating member and arranged about said periphery to define a plurality of arcuate gaps therewith and in circular array, and means for sweeping said beam to pass through said gaps in succession.

14. An electron discharge device in accordance with claim 13 comprising a plurality of metallic strip shields, each of said shields extending between and spacing two adjacent deflector members and having insulating coatings upon opposite faces contacting the respective adjacent deflector members.

15. An electrical system comprising an electron discharge device comprising means for projecting an electron beam, an electrode opposite said means and having a periphery of preassigned configuration, the face of said electrode toward said means having a secondary electron emission coefficient greater than unity, a collector electrode adjacent said face, a first deflection means for rotating said beam to follow a path adjacent said periphery, a second deflection means for deflecting said beam normal to said periphery, and means including a feedback connection between said collector electrode and said second deflection means for holding said beam to a path in proximity to said periphery, as it is deflected by said first deflection means.

RAYMOND W. SEARS.

REFERENCES CITED

The following references are of record in the file of this patent:

UNITED STATES PATENTS

| Number | Name | Date |
|---|---|---|
| 2,265,848 | Lewis | Dec. 9, 1941 |
| 2,379,880 | Burgess | July 10, 1945 |
| 2,423,078 | Anderson | July 1, 1947 |
| 2,468,085 | Labin et al. | Apr. 26, 1949 |